March 1, 1966  R. E. AYERS  3,237,966
TRUCK COUPLING

Filed Dec. 5, 1962  3 Sheets-Sheet 1

INVENTOR.
RALPH E. AYERS
BY
LeBlanc and Shur
ATTORNEYS

March 1, 1966　　　R. E. AYERS　　　3,237,966
TRUCK COUPLING
Filed Dec. 5, 1962　　　　　　　　　　3 Sheets-Sheet 2

INVENTOR.
RALPH E. AYERS
BY
Le Blanc and Shur
ATTORNEYS

March 1, 1966  R. E. AYERS  3,237,966
TRUCK COUPLING
Filed Dec. 5, 1962  3 Sheets-Sheet 3

INVENTOR.
RALPH E. AYERS
BY
*LeBlanc and Shur*
ATTORNEYS 3,237,966
TRUCK COUPLING
Ralph E. Ayers, Las Vegas, Nev., assignor to T.A.C. Enterprises, Inc., Las Vegas, Nev., a corporation of Nevada
Filed Dec. 5, 1962, Ser. No. 242,538
5 Claims. (Cl. 280—408)

This invention relates to truck couplings or hitches for transport vehicles and more particularly to a conversion unit for attaching a trailer to the power unit of a truck.

Various types of couplings and fifth wheel hitch assemblies are known for connecting a trailer to the tractor of a truck. However, many of the more common hitches are subject to jack-knifing during a rapid deceleration due to the more or less flexible nature of the coupling between tractor and trailer. Furthermore, the flexible couplings render a truck difficult to handle even during normal driving. This problem is particularly aggregated when the power unit is pulling "sets of doubles" since the double trailer arrangement makes the truck that much more difficult to control in the traffic, especially during adverse weather or on icy roads. Likewise, the more or less free or pivotal hitches between tractor and trailer add substantially to accidents in the yard particularly when the driver is trying to park a set of doubles in a crowded dock area.

The present invention avoids the above-mentioned difficulties by providing a novel conversion arrangement wherein a trailer may easily and readily be hitched to a tractor to produce a non-pivotal or truck-like coupling between the drive unit and the trailer. In addition to improving safety and making the truck much more easy to handle, the novel coupling of the present invention makes it possible to significantly increase payloads. For example, by converting the power unit and the first trailer of a set of doubles into a single unit, the safety or buffer space between the cab of the power unit and the trailer is no longer needed with the consequence that longer trailers can be used. Finally, in sections of the country where the load limit is determined in part by wheel base, tire size, number of tires, and distance between axles, increased payloads can be accomplished by equipping all axles with dual wheels and tires and by moving drive axles further apart. Because of the increased ease of handling, accidents both in traffic and in the yards are substantially reduced as is the danger of jack-knifing during rapid braking.

It is, therefore, a primary object of the present invention to provide a novel road vehicle.

Another object of the present invention is to provide a novel hitch for tractor trailer combinations.

Another object of the present invention is to provide a novel conversion unit.

Another object of the present invention is to provide an arrangement for converting a tractor trailer combination into a rigidly coupled truck.

Another object of the present invention is to convert the power unit and first trailer of a set of doubles into a single unit.

These and further objects and advantages of the invention will be more apparent up reference to the following specifications, claims and appended drawings wherein:

Figure 1:
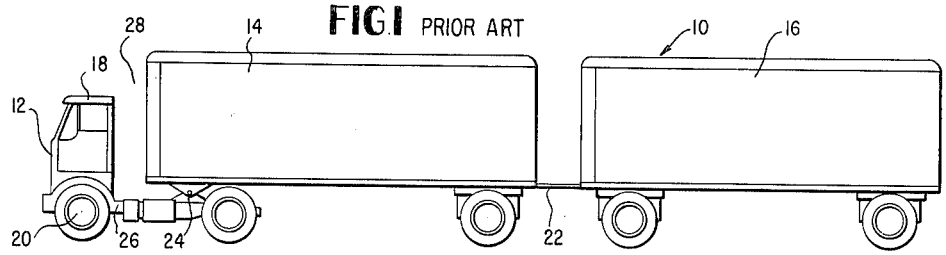
FIGURE 1 is a side view of a set of doubles constructed in accordance with the prior art.

Referring to the drawings, FIGURE 1 shows a conventional set of doubles constructed in accordance with the prior art generally indicated at 10 comprising a power unit or tractor 12, a first or front trailer 14 and a second trailer 16.

The power unit 12 of the truck includes a cab 18 mounted directly over the front axle 20. The front and rear trailers are connected together by a conventional hitch 22 and the front trailer 14 is connected to the tractor 12 by a relatively flexible hitch 24 generally including a pivotally mounted fifth wheel connected to a king pin on the front end of the trailer 14. The fifth wheel is conventionally mounted on the frame 26 of the power unit. In order to insure clearance between the front trailer 14 and the cab 18 there is provided the conventional safety or buffer space 28.

Figure 2:
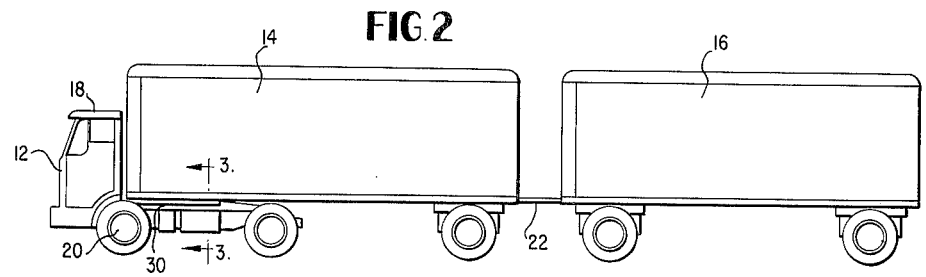
FIGURE 2 is a side view of a modified set of doubles constructed in accordance with the present invention.

FIGURE 2 shows a modified set of doubles constructed in accordance with the present invention with like parts bearing like reference numerals. It will be noted in FIGURE 2 that the front trailer 14 is more or less rigidly secured to the power unit 12 by means of a novel coupling or hitch generally indicated at 30. In the construction of FIGURE 2, the cab 18 is moved forward so that it is located entirely in front of the front axle 20 and in addition the safety space 28 is eliminated. This makes it possible to carry the same or a greater payload while at the same time shortening the overall length of the truck.

Figure 3:
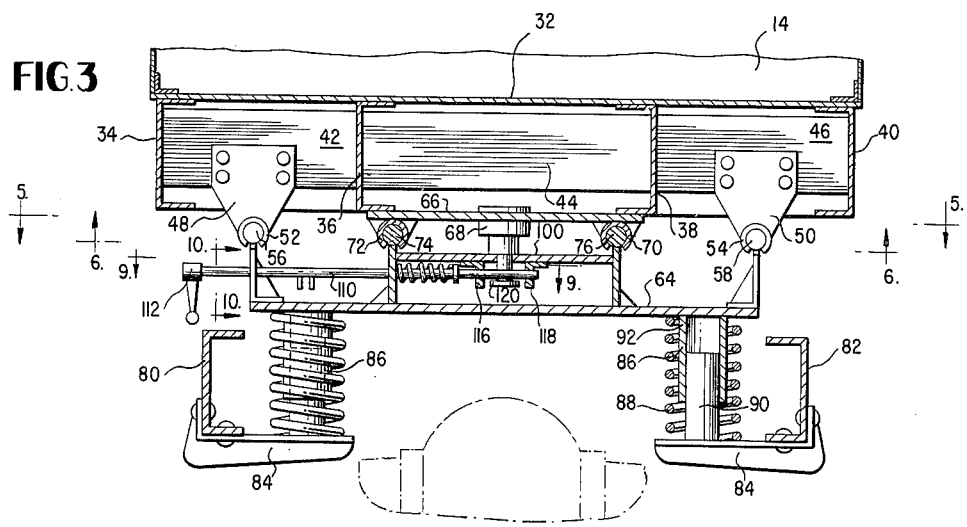
FIGURE 3 is a partial cross section taken along line 3—3 of FIGURE 2 showing details of the truck and first trailer coupling or hitch.
Figure 4:
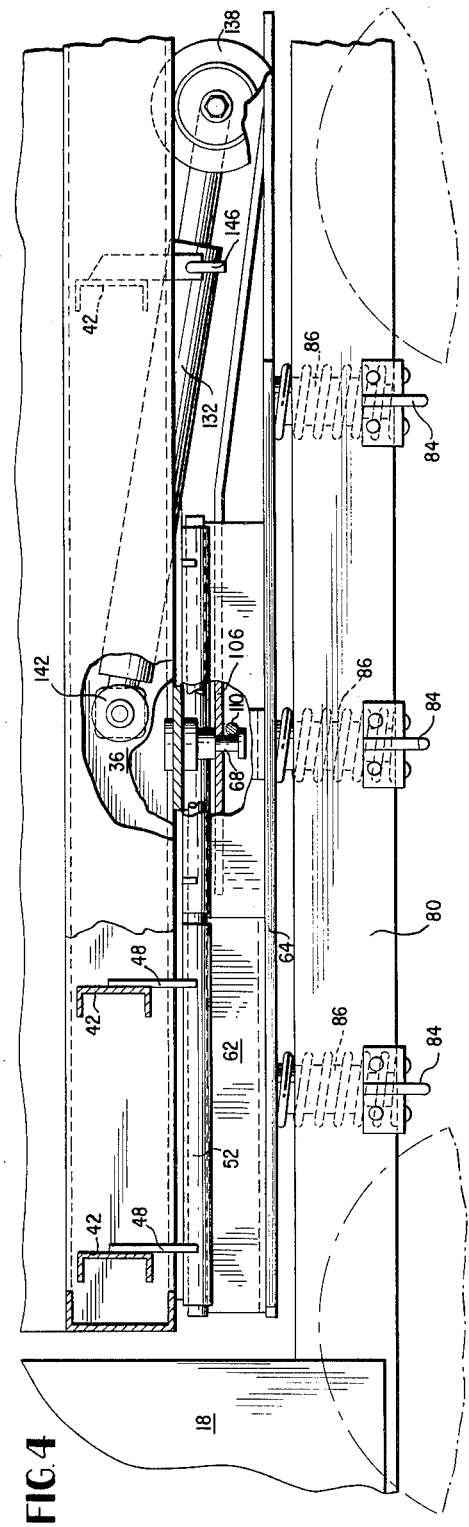
FIGURE 4 is a side view of the truck and trailer hitch with parts broken away and parts in section.
Figure 7:
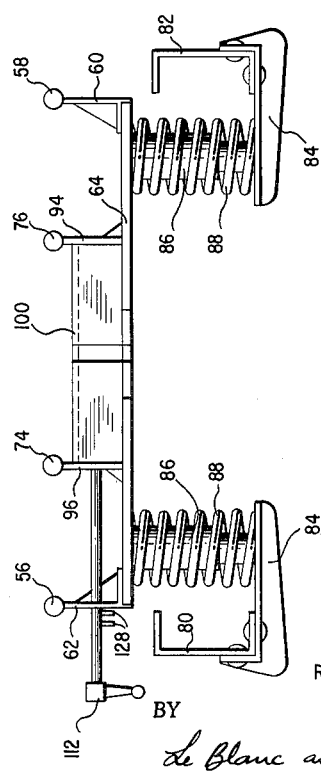
FIGURE 7 is an end view of the tractor portion of the hitch illustrated in FIGURE 3.

FIGURE 3 is a cross section taken along line 3—3 of FIGURE 2 and shows the novel hitch arrangement of the present invention. The bed 32 of the trailer 14 is mounted on the trailer frame comprising longitudinal channels 34, 36, 38 and 40, extending along the length of the trailer with short cross channels 42, 44 and 46 in between. Connected to the short outer transverse channels 42 and 46 are brackets such as brackets 48 and 50 which support a pair of elongated hollow tubes 52 and 54. These latter tubes slidably receive elongated rods 56 and 58. The rods are supported by angle irons 60 and 62 as best seen in FIGURES 4 and 7. These latter angle irons are secured to the edges of a flat plate 64 resiliently mounted on the tractor frame.

Figure 8:
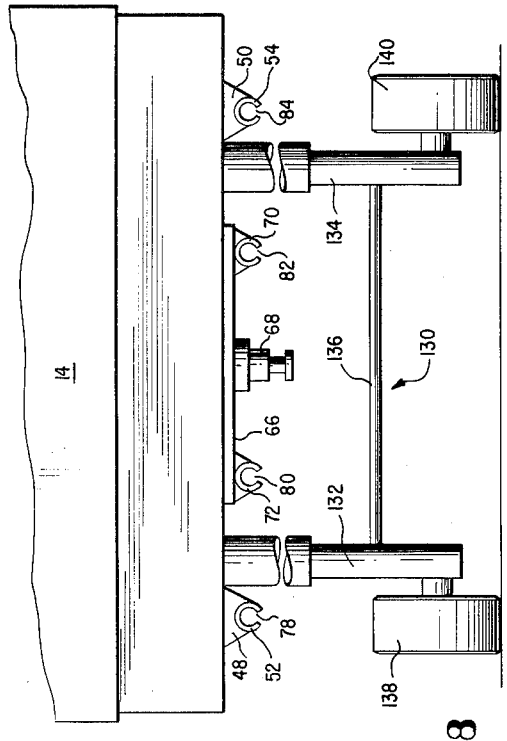
FIGURE 8 is an end view of the first trailer.

Trailer 14 is also provided with a king pin plate connected to the center elongated channels 36 and 38 which king pin plate indicated at 66 carries a king pin 68 as best seen in FIGURE 8. Depending from the king pin plate 66 are a pair of longer center tubes 70 and 72 which slidably receive rods 74 and 76 mounted on flat plate 64. As best seen in FIGURE 8 each of the tubes 52, 72, 70 and 54 is provided with an elongated slot 78, 80, 82 and 84 respectively receiving the supports for the respective rods of the tractor.

Secured to the side channels 80 and 82 forming a part of the tractor frame are a plurality of support brackets 84. These brackets form part of a resilient support assembly 86 which resiliently supports the flat plate 64 of the tractor. Each of the support assemblies 86 is of similar construction and includes a heavy compression spring 88 having its ends welded or otherwise suitably secured to the brackets 84 and the plate 64 respectively.

Figure 5:
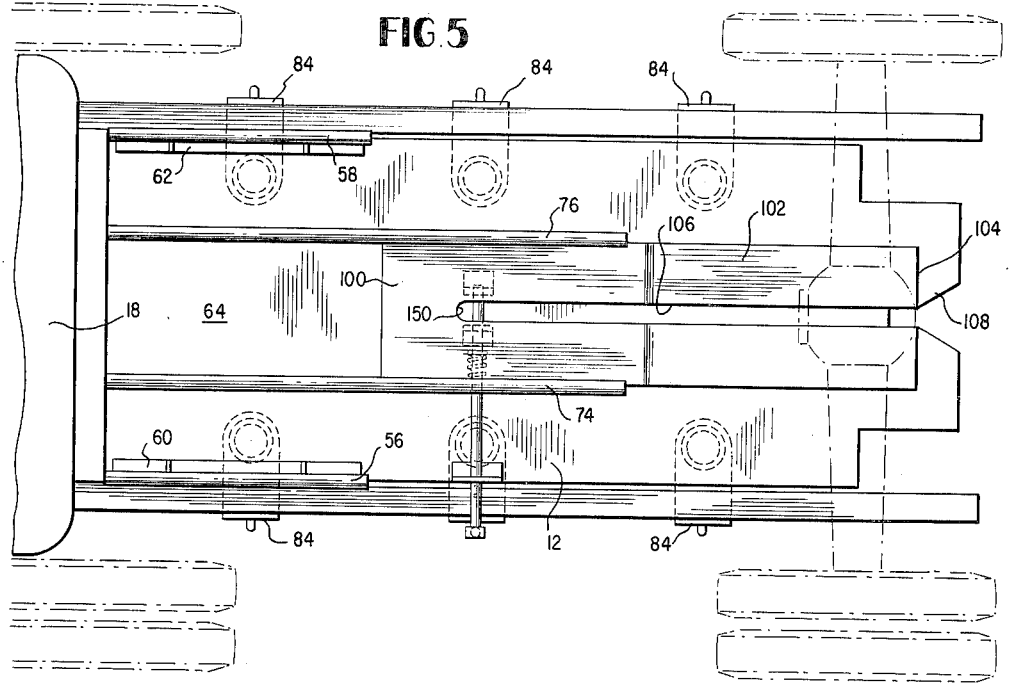
FIGURE 5 is a cross section taken along line 5—5 of FIGURE 3 showing a plan view of the tractor portion of the hitch.

The springs 86 as best seen in FIGURE 3 surround a central post 94 integral with each of the brackets 84 and slidably received in a sleeve 92 secured to the plate 64. Angles 94 and 96 mounted near the center of the plate 64, which angles carry rods 74 and 76, also support a fifth wheel plate 100. Plate 100 as best seen in FIGURE 5 is provided with a riser 102 sloping downwardly towards the rear of the tractor until it touches the plate 64 as indicated at 104 in FIGURE 5. The slanted portion or riser in conjunction with the flat forward portion 100 of the plate define an elongated king pin slot 106 terminating in a mouth 108 for guiding the king pin into position.

Figures 9, 10:
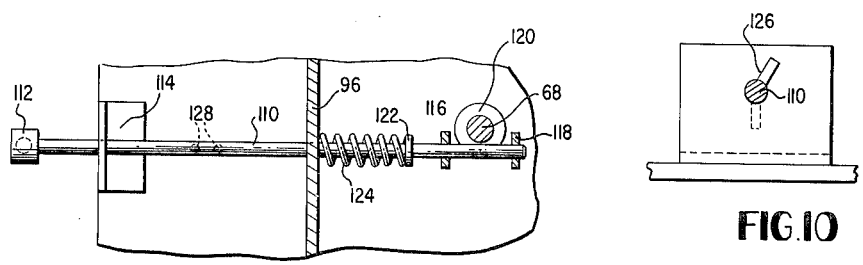
FIGURE 9 is a partial cross section showing the king pin retaining bar.
FIGURE 10 is a cross section through the retaining bar of FIGURE 9.

Referring particularly to FIGURES 3, 9 and 10, the king pin is received in the slot 106 and is retained by a longitudinally movable and rotatable bar 110 connected to a handle 112. Bar 110 is slidable through a suitable aperture in the angle 96 and also is rotatable therein as well as in bracket 114. Bar 110 also passes through a pair of small angle members 116 and 118 and acts to lock the lower flange 120 of the king pin 68 so that the king pin is securely retained in the extreme forward end 150 of king pin guide slot 106.

Retaining bar 110 is provided with a collar 122 against which bears one end of the spring 124 constantly urging the bar into king pin locking or its extreme right hand position which is limited by engagement of the collar with the angle member 116. Bracket 114 is provided with an angled slot 126 slightly larger than a pair of pins 128 extending radially outward from the bar 110 at slightly different angular positions around the periphery of the bar. In order to release the king pin, retaining bar 110 is moved outwardly by handle 112 against the force of spring 124. When the outermost of the pins 128 engages the bracket 114, the bar is suitably rotated by the handle so that the pins 128 successively pass through the slot 126 in the bracket. The rod 110 is then suitably rotated into the position illustrated in FIGURE 7 so that the innermost of the pins 128 bears on the outer surface of the bracket 114 so as to retain the locking bar 110 in its unlatched position. By re-rotating the locking bar and passing the pins 128 back through the slot 126, the bar under the pressure of spring 124 returns to the locking position illustrated in FIGURES 3 and 9.

Figure 6:
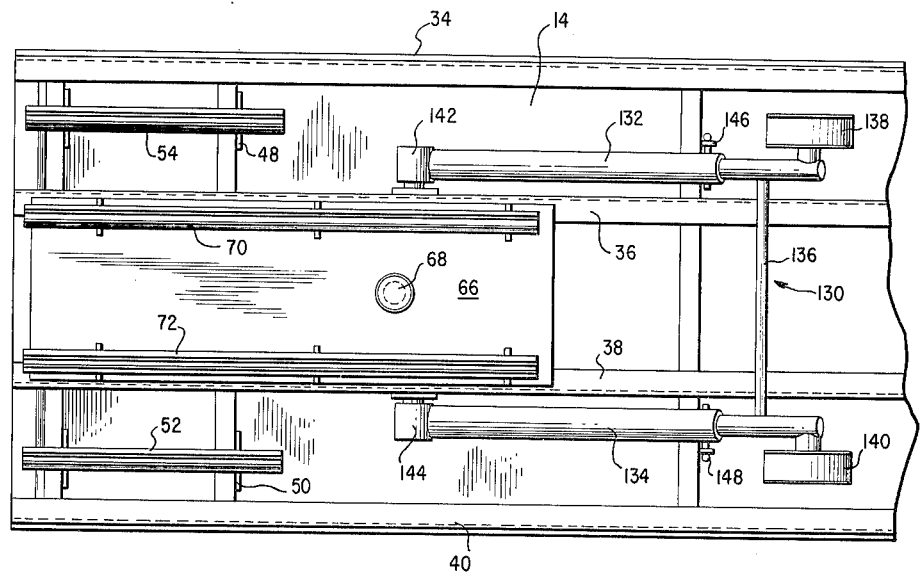
FIGURE 6 is a cross section taken along line 6—6 of FIGURE 3 showing the underside of the first trailer.

As best seen in FIGURES 6 and 8, the trailer 14 is provided with a collapsible landing gear generally indicated at 130 comprising legs 132 and 134 connected by a cross brace 136 and carrying wheels 138 and 140. The two legs are pivotally mounted as at 142 and 144 to the center channels 36 and 38 of the trailer frame so as to be retractable into the position illustrated in FIGURES 4 and 6. The wheels may be held in retracted position by suitable latches indicated generally at 146 and 148.

In effecting the coupling between the front trailer and the drive unit or tractor 12, the trailer 14 is conventionally parked with its landing gear 130 down. The drive unit is backed up to the front of the trailer and the legs 132 and 134 of the landing gear which are preferably adjustable are moved upwardly or downwardly until the proper height is reached. The truck is then backed further until the king pin is securely in the slot 106 with the tractor supporting the front end of the trailer. The landing gear is then retracted and latched into the position illustrated in FIGURE 4. The king pin latching bar is now withdrawn and the trailer further backed up until the king pin reaches the end 150 of the slot 106. During this backing up process the rods on the tractor engage in the ends of the tubes on the underside of the front end of the trailer and slide along in these tubes. The resilient mounting of the rods permits slight adjustment for misalignment. The retaining bar 110 is then released and slid into latching engagement with the king pin and the coupling is complete. To uncouple the trailer the procedure is reversed. With the latching bar first disengaged from the king pin the tractor is then driven slightly forward until the landing gear is lowered and then completely driven out from under the front end of the trailer leaving it supported on the landing gear 130.

It is apparent from the above that the present invention provides a novel tractor to trailer hitch which may be simply and readily effected to convert a tractor combination into substantially rigidly coupled truck assembly. The apparatus of the present invention requires a minimum modification of both a conventional trailer and a conventional drive unit or tractor. The present invention greatly improves the safety of the unit with respect to jack-knifing and handling in traffic or on slippery roads. Furthermore, it is possible to use longer trailers and to adjust the axle spacing so as to substantially increase the payloads where permitted. By converting a set of doubles into a truck and trailer combination, the entire group is much more easily controlled by the driver in traffic, especially during adverse weather or on icy roads. Accidents in the yards are also decreased due to the greater ease in parking a truck and trailer as compared to the difficulty in parking a set of doubles in a crowded dock area. By converting the power unit in the first trailer of a set of doubles into a single unit, the safety or buffer space between the cab of the power unit and the trailer is no longer needed, with the consequence that longer trailers can be used. In sections of the country where the load limit is determined in part by the wheel base, tire size, number of tires, and the distance between axles, increased payloads can be accomplished by equipping all axles with dual wheels and tires and by moving drive axles further apart.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automative vehicle comprising a tractor including a frame, a trailer, a plate resiliently mounted for limited vertical movement on said tractor frame, said plate supporting a plurality of elongated parallel rods extending longitudinally of said tractor, a plurality of parallel tubes for telescopingly receiving said rods mounted on the underside of the front end of said trailer, a riser on said tractor defining a king pin guide slot, a king pin on said trailer and releasable means for locking said king pin in said slot.

2. A vehicle according to claim 1 wherein said riser is mounted on said plate.

3. An automotive vehicle comprising a tractor including a cab, a front axle and a frame, said cab being positioned entirely forward of said front axle, a trailer, a plate resiliently mounted for limited vertical movement on said tractor frame, said plate supporting a plurality of elongated parallel rods extending longitudinally of said tractor frame from adjacent said cab toward the rear of said frame, a plurality of corresponding parallel tubes telescopingly receiving said rods mounted on the underside of the front end of said trailer, said trailer extending substantially to a vertical plane passing through the front axle of said tractor, a riser defining a king pin guide slot mounted on said plate, a king pin on said trailer slidably received in said slot, and a longitudinally movable and rotatable retaining bar releasably locking said king pin in said slot.

4. A vehicle according to claim 3 including an adjustable and retractable landing gear mounted on said trailer.

5. A vehicle according to claim 4 wherein said trailer comprises the forward trailer of a set of doubles.

(References on following page)

References Cited by the Examiner

UNITED STATES PATENTS

| | | | |
|---|---|---|---|
| 1,316,735 | 9/1919 | Olds | 280—438 X |
| 1,803,866 | 5/1931 | Patterson | 180—14 |
| 2,131,083 | 9/1938 | Winn | 180 |
| 2,291,626 | 8/1942 | Huber | 280—423 X |
| 2,317,972 | 5/1943 | Ash | 280—423 X |
| 2,855,064 | 10/1958 | McCullough | 296—28.2 X |
| 2,871,026 | 1/1959 | Hotchkiss | 280—423 |
| 2,925,135 | 2/1960 | Hamilton | 180—12 |
| 3,151,880 | 10/1964 | Black | 280—408 |

FOREIGN PATENTS

| | | |
|---|---|---|
| 958,619 | 2/1957 | Germany. |
| 530,924 | 12/1940 | Great Britain. |
| 584,230 | 1/1947 | Great Britain. |

OTHER REFERENCES

Brochure by McBright Inc. of Lehighton, Pa., on "Lite Way" trucks, models SS, ST and TT (4 pgs.).

BENJAMIN HERSH, *Primary Examiner.*

LEO FRIAGLIA, A. HARRY LEVY, *Examiners.*